(12) United States Patent
Radon et al.

(10) Patent No.: US 8,554,736 B2
(45) Date of Patent: Oct. 8, 2013

(54) BACKUP METHOD (75) Inventors: Hendrik Radon, Ehningen (DE); Phillip Plapp, Stuttgart (DE); Bernhard Kappler, Herrenberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 723 days.

(21) Appl. No.: 12/432,980

(22) Filed: Apr. 30, 2009

(65) Prior Publication Data

US 2010/0280994 A1 Nov. 4, 2010

(51) Int. Cl.
*G06F 7/00* (2006.01)

(52) U.S. Cl.
USPC .......................................... 707/644; 707/640

(58) Field of Classification Search
None
See application file for complete search history.

(56) References Cited

U.S. PATENT DOCUMENTS

| | | | |
|---|---|---|---|
| 6,330,570 B1 * | 12/2001 | Crighton | 1/1 |
| 7,797,279 B1 * | 9/2010 | Starling et al. | 707/641 |
| 7,831,561 B2 * | 11/2010 | Wertheimer et al. | 707/640 |
| 7,865,471 B1 * | 1/2011 | Stagg | 707/640 |
| 7,865,472 B1 * | 1/2011 | Orcutt | 707/640 |
| 2002/0059505 A1 * | 5/2002 | St. Pierre et al. | 711/162 |
| 2002/0107877 A1 * | 8/2002 | Whiting et al. | 707/204 |
| 2003/0126247 A1 * | 7/2003 | Strasser et al. | 709/223 |
| 2005/0055520 A1 * | 3/2005 | Kappler | 711/162 |
| 2007/0027937 A1 * | 2/2007 | McGrattan et al. | 707/204 |
| 2008/0126723 A1 * | 5/2008 | Ashton et al. | 711/162 |
| 2008/0208933 A1 * | 8/2008 | Lyon | 707/204 |
| 2009/0193061 A1 * | 7/2009 | Niwata et al. | 707/204 |
| 2010/0169594 A1 * | 7/2010 | Tsaur et al. | 711/162 |
| 2011/0078008 A1 * | 3/2011 | Postrel | 705/14.23 |

* cited by examiner

*Primary Examiner* — Etienne Leroux
*Assistant Examiner* — Thu Nga Nguyen (57) ABSTRACT

A method of backing up a backup space includes splitting a complete backup of the backup space into a number of rolling backups, and backing up a portion of unchanged files and all changed and new files on each of the rolling backups.

14 Claims, 5 Drawing Sheets

BACKUP METHOD

BACKGROUND

Backing up files or data on a computer system can be very time consuming due to the increasing amounts of data that are to be backed up, and the increasing size of storage devices. A full backup of a system can take multiple days. Incremental backups performed after a full system backup may result in long chains of backups that are required to restore a full system.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process or mechanical changes may be made without departing from the scope of the present disclosure. The following detailed description is, therefore, not to be taken in a limiting sense, and the scope of the present disclosure is defined by the appended claims and equivalents thereof.

In the description, certain terms have been given certain definitions. Those definitions are as follows.

A backup space is a set of files which is to be backed up within a computer system or part of a computer system, and is defined by at least one mount point and at least one subtree on each of the mount point(s). Exclusions from the backup space may be defined by listing more subtrees and/or file name patterns.

A rolling backup is one backup in a series of rolling backups and contains all files which changed or were newly created since the previous rolling backup, and 1/Nth of the unchanged files.

A rolling full backup is a complete backup of new or changed files and unchanged files within a backup space, completed over a rolling backup period. A rolling full backup can comprise a series of N rolling backups which contain copies of all files which existed in the backup space at the time of the last rolling backup.

A backup session (or rolling backup session) is one execution of a backup. This may be a full backup (if N=1), an incremental backup, or 1/Nth of a rolling backup.

A rolling backup period (also referred to as a backup period or a period) is a time which passes between a first and a last backup session of a rolling backup of the same backup space, expressed in some embodiments as N days or N backup sessions, in which a complete backup of the backup space is created over the N days or N backup sessions.

A restore chain is the set of backup sessions which need to be read at restore time to allow a full backup space restore.

A file system tree is an ordered and repeatable map of the backup space containing at least file path locations.

One method of backing up a file system is to perform a full backup at regular intervals, typically between 1 and 2 weeks. Between full backups, incremental backups are typically performed daily. If the file system is large, the full backup can take a long time. Most of the backups are incremental backups which usually transfer only a small fraction of the data and take a small fraction of the time of a full backup. The backup infrastructure is used to support a full backup in an often limited backup window.

If there are many incremental backups between two full backups, or if only one full backup exists with a long series of incremental backups, and the complete file system is to be restored, e.g., because of a hard disk failure or the like, every incremental backup session, even if there are many, are read, and possibly many media (e.g. tapes) are loaded and used at restore time. The restore chain can be very long, and the restore process could take a very long time. Such methods use a full backup performed at the beginning of the backup process, and such full backups can be problematic. For example, full backups may not be able to be run due to time constraints, network cost, or because a long backup would fail due to network outages or the like. A large system can take many hours of time to back up. Because of this, a backup load is not typically distributed equally. For example, backups are typically performed during off-hours. However, for a full backup of a large system, the load may be such that off-hours are not sufficient to perform the backup. Because of this, the load of a process using a full backup and incremental backups can be unevenly distributed, leading to further problems.

The embodiments of the present disclosure split a complete backup of a backup space into manageable increments. The backup space is backed up over a number of rolling backup sessions, with a portion of the full backup completed during each rolling backup session. After a number of rolling backup sessions N, the backup space is fully backed up. After each subsequent rolling backup session, a complete backup is maintained over the current rolling backup session and N−1 previous rolling backup sessions. No one-time or initial full backup is used. Instead, the complete backup is split into smaller and more manageable increments.

Figure 1:
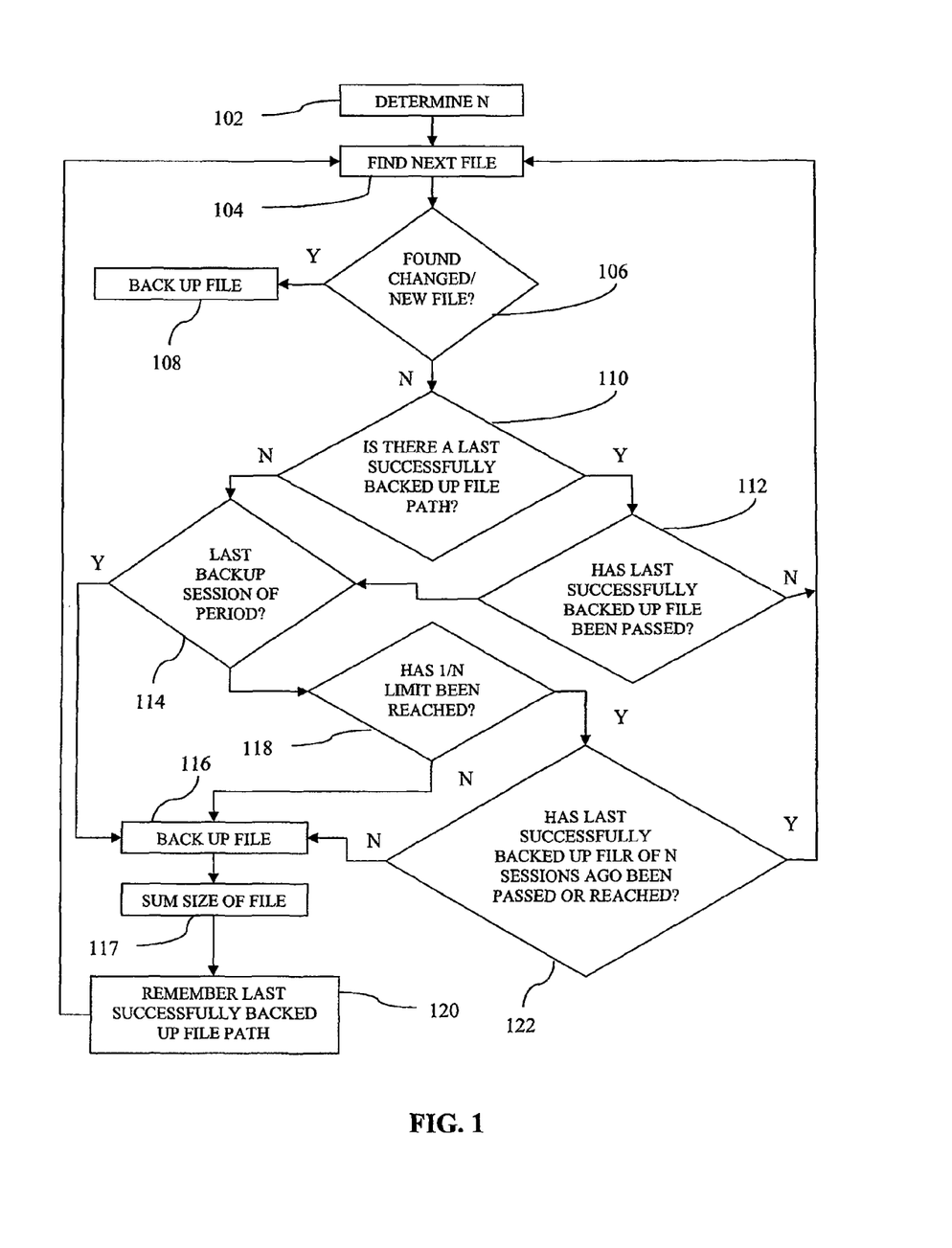
FIG. 1 is a flow chart diagram of a method of backing up a backup space, according to an embodiment of the disclosure.

An embodiment of one method 100 of backing up a backup space is shown in FIG. 1. In block 102, a number N of backup sessions to complete a complete backup is determined. This can be determined in a number of different ways without departing from the scope of the disclosure, as described further below. The file system tree is walked in block 104 until a file is encountered. When a file is encountered, a determination is made as to whether the file is new or changed since the last backup session, or whether the file is unchanged from the last backup session, in decision block 106. If the file is changed or new since the last backup session, the file is backed up in block 108, and the process returns to block 104.

If the file is unchanged since the last backup job, then it is determined if there is a last successfully backed up file path from a previous backup session in decision block 110. If there is a last successfully backed up file path (as described further below), then the location of the current unchanged file in the file system tree is compared with the location of the last successful file backed up in the file system tree in decision block 112. If the last successfully backed up file has not been passed, the file tree walk continues at block 104, without backing up the file.

If it is determined in decision block 112 that the last successfully backed up file has been passed, or if it is determined in decision block 110 that there is not a last successfully backed up file path from a previous backup session, process flow continues with decision block 114. In decision block 114, it is determined if the current backup session is the last of the period, that is, is it the Nth backup of a current N backup sessions within the current rolling backup period. If so, the unchanged file is backed up in block 116, its size or other characteristic(s) allowing breakup of the system space into N parts is summed and stored in block 117, and the file tree walk continues at block 104.

If it is determined that the current backup session is not the last (Nth) backup session of the rolling backup period, a determination is made in block 118 whether a backup limit of 1/Nth of the backup space, however that has been determined (as described further below), has been reached. If the limit has not been reached, the unchanged file is backed up in block 116, its size or other characteristic(s) allowing breakup of the system space into N parts is summed and stored in block 117, its path is remembered (as the last successfully backed up file of that session) in block 120 and the file tree walk continues at block 104. If it is determined that the limit of 1/N has been reached, the decision is made if the last successfully backed up file of N sessions ago (so it exists) has been reached or passed (in case the file has been deleted) in block 122. If it has not been reached the process continues at block 116 with backing up the file. If the last successful backed up file of N sessions ago has been reached or passed the file system tree walk continues with block 104.

When the walk through the entire file system tree is completed, the backup session is completed. All files within the file system tree are reviewed for every session, since each backup session backs up all new and unchanged files in the file system tree. Within each backup session, an unchanged file is ignored if the file has been previously backed up within the current backup period, or if the limit of 1/N has been reached within the current backup session, unless the current backup session is the last of the period, in which case all remaining unchanged files are backed up.

In another embodiment, a change log or other record, such as that contained in a file database, is used to determine which files have changes and are to be backed up in an incremental backup. In this embodiment, the backup application maintains a record of how many files are within the backup space, and combines this with the information of a change log. It should be understood that many processes of checking whether files have been backed up are amenable to use with the various embodiments, and are within the scope of the disclosure.

There are several ways of determining the size of a backup session within a rolling backup. One way is to specify N based on the number of backup sessions desired to complete a full backup. This provides for a rolling full backup after the Nth backup session is completed. Each subsequent successful backup session after the Nth backup session provides for a full backup over the current backup session plus the previous N−1 backup sessions, that is, once the Nth backup session is successfully completed, then provided subsequent backup sessions are successful, every N backup sessions in sequence provide a full backup of the backup space.

In another embodiment, backup sessions are governed by specifying the length or size of each backup session. Use of this embodiment to determine the size of a backup session does not generally provide for a strict limit on the number of backup sessions, although the number can be estimated. In a size use, this embodiment allows an administrator or the like to choose a specific size for each backup session, such as for example when backups are limited in size due to disc or tape constraints. Once the specific size of the current backup session has been reached, the backup session ends with the last successfully backed up file stored so that the next subsequent backup session can begin after that file, as described above with respect to method 100.

If the size of 1 rolling backup is specified we can hardly guarantee this size as we want to backup all new and changed files and we can't predict their size. The first file tree walk would give us the number/size of the new and changed files so the remaining space in the backup could be used for unchanged files. But it could happen that the number/size of the new and changed files exceeds the size limit so this limit can only be an estimate and not a hard limit.

Figure 2:
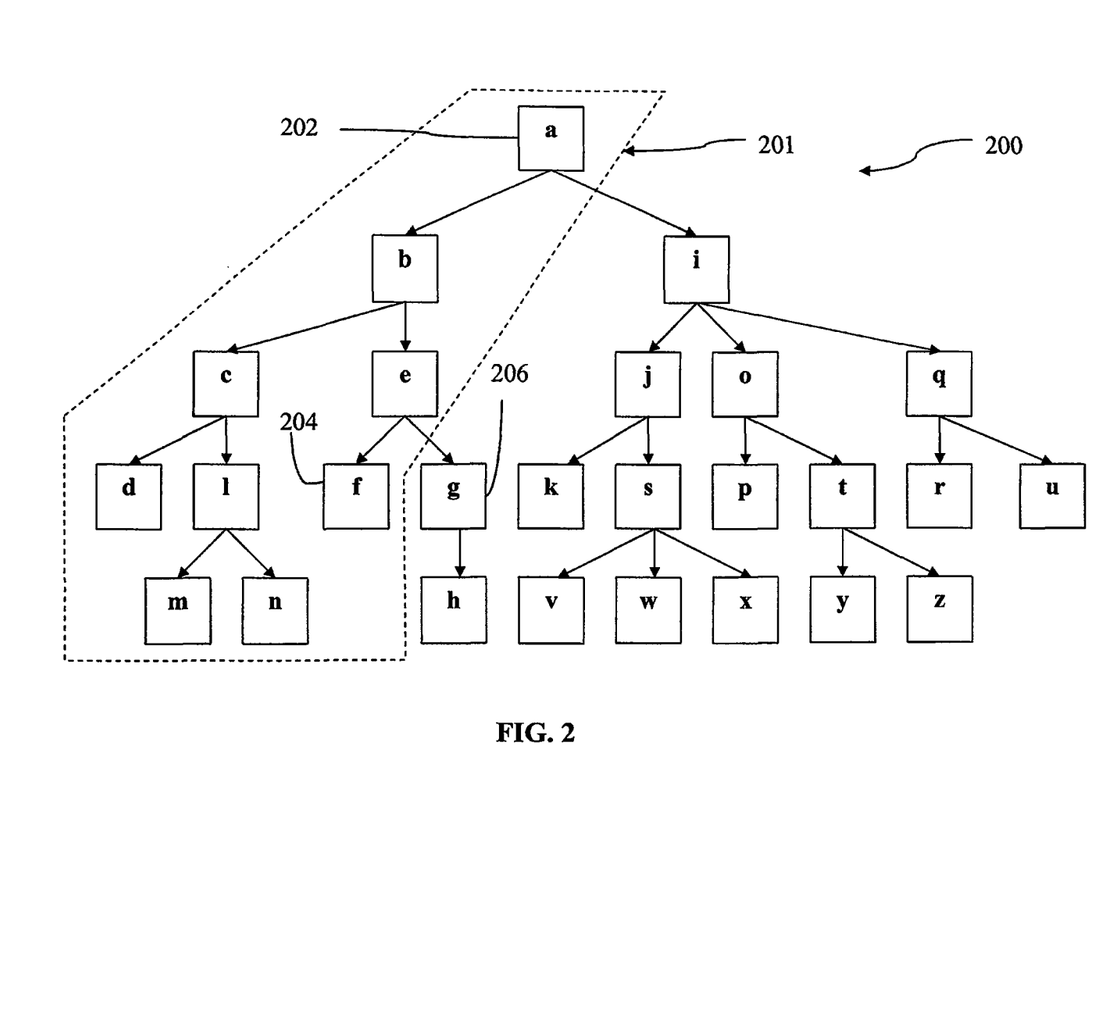
FIGS. 2-4 are graphical representative views of a representative file system backup space, according to an embodiment of the disclosure.
Figure 3:
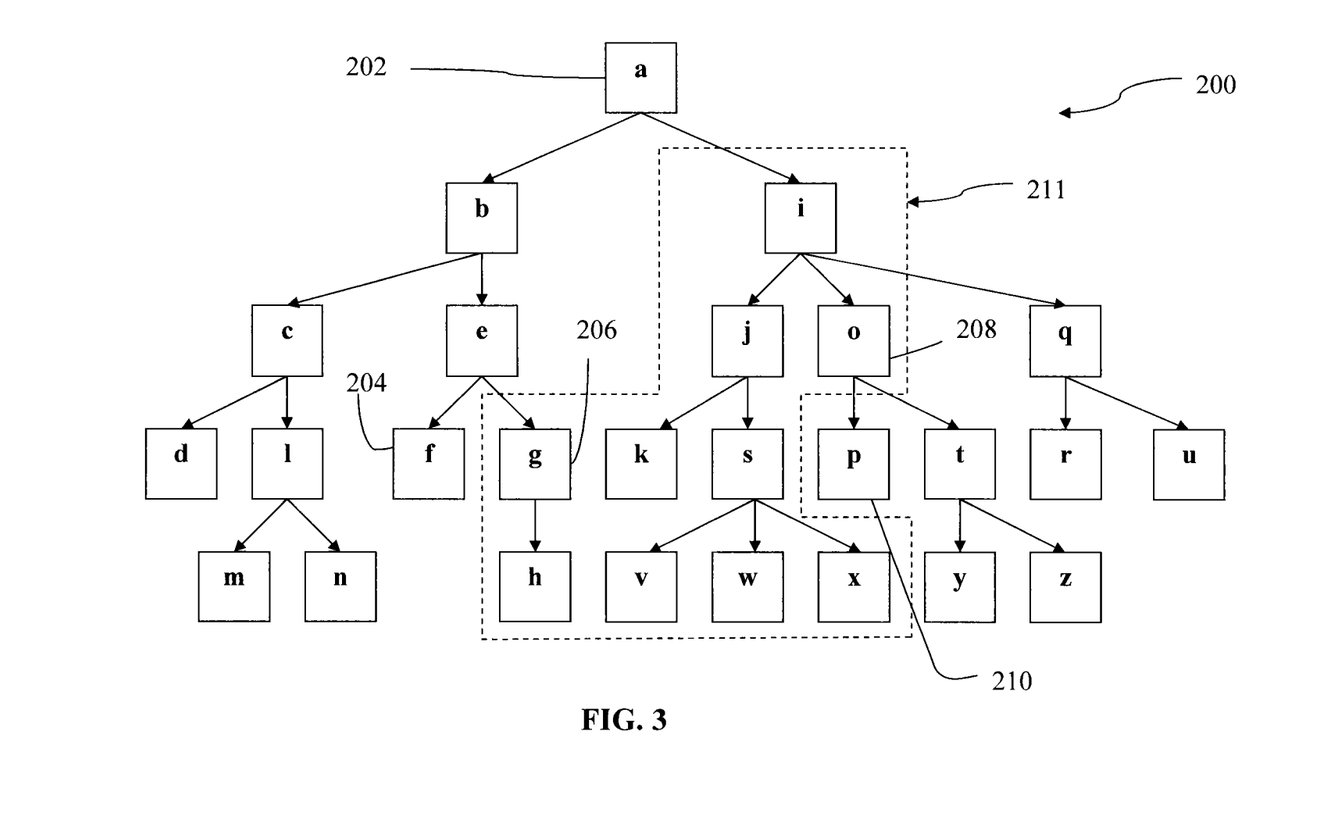
Figure 4:
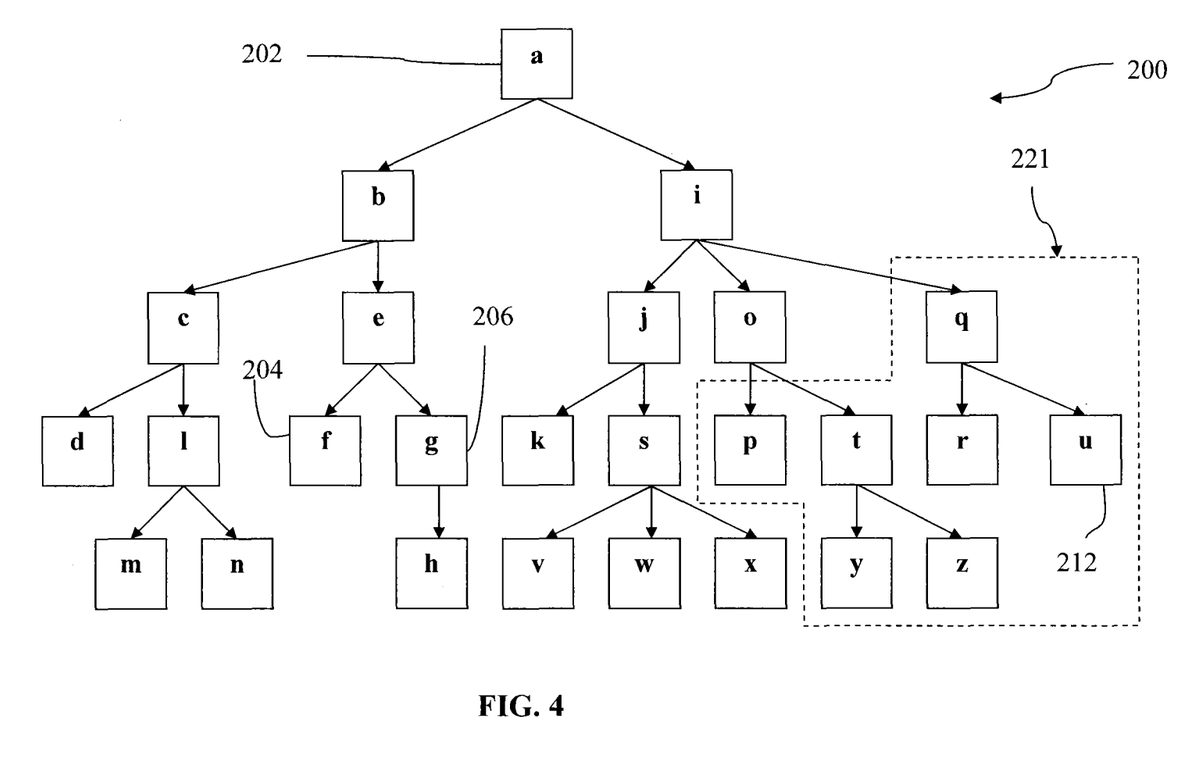

In operation, the method of creating and performing a rolling backup is shown in greater detail in FIGS. 2, 3, and 4. In this example, a rolling backup with N=3 is described. FIG. 2 shows a file system tree 200 having files in a hierarchy. After the file system tree has been walked to determine the backup space, the N parameter is used to divide the backup space. The file system tree is walked, backing up all changed and new files in a traditional incremental backup scheme. The file system tree shown in FIG. 2 shows all the unchanged files in the file system at the start of the rolling backup period. At backup session one of three, the files are backed up in the tree in order, starting at file a (202) and backing up through file a/b/e/f (204), which is one third (1/N) of the files in the backup space. This is shown graphically as the files in within area 201. Following the process outlined above with respect to FIG. 1, unchanged files are found from file a through file a/b/e/f. As each unchanged file is backed up, the size of the backed up files, or in another embodiment, the number of backed up files, is summed, and when the file tree walk process reaches unchanged file a/b/e/g (206), the algorithm has already backed up the 1/N limit of files, file size, or the like, and since the backup session is not the last of the rolling backup period, the last successfully backed up file, file a/b/e/f, is remembered, and the first backup session is complete. In one embodiment, once N is determined, and the total number of bytes in the backup space are determined, approximately 1/N of the bytes in unchanged files in the backup space are backed up per backup session.

FIG. 3 shows the second of three backup sessions with parameter N=3. FIG. 3 also shows the file tree system having the same set of unchanged files in a hierarchy. It should be understood that some of the previously unchanged files could have been changed since the last backup session. If that is the case, the incremental backup of new and changed files would back up those files. For this example, however, a file system tree with the same set of unchanged files is shown. Progressing through the process, the unchanged files up to file a/b/e/f in the file tree walk are ignored since the last successful file of the previous backup session, file a/b/e/f, has not been passed. When file a/b/e/g is reached, the last successful file (a/b/e/f) has been passed, and backup session two of three backs up its first unchanged file. Following the process outlined above with respect to FIG. 1, unchanged files are found from file a/b/e/g through file a/i/o (208). This is shown graphically as the files within area 211. As each unchanged file is backed up, the size of the backed up files, or in another embodiment, the number of backed up files, is summed, and when the file tree walk process reaches unchanged file a/i/o/p (210), the algorithm has already backed up the 1/N limit of files, file size, or the like, and since the backup session is not the last of the rolling backup period, the last successfully backed up file, file a/i/o, is remembered, and the second backup session is complete.

In rolling backups in which N is greater than three, each intermediate backup session follows the process described with respect to FIG. 3. That is, each backup session after the first backup session, up to the N−1th backup session, is performed as shown and described with respect to FIG. 3. Once the last successfully backed up file is passed, the backup of unchanged files continues until another 1/N of the files, file size, or the like is backed up.

FIG. 4 shows the third and last of three backup sessions with parameter N=3. FIG. 4 also shows the file tree system having the same set of unchanged files in a hierarchy. It should again be understood that some of the previously unchanged files could have been changed since the last backup session. If that is the case, the incremental backup of new and changed files would back up those files. For this example, however, a file system tree with the same set of unchanged files is shown. Progressing through the process, the unchanged files up to file a/i/o in the file tree walk are ignored since the last successful file of the previous backup session, file a/i/o, has not been passed. When file a/i/o/p is reached, the last successful file (a/i/o) has been passed, and backup session three of three backs up its first unchanged file. Following the process outlined above with respect to FIG. 1, unchanged files are found starting with file a/i/o/p. Since backup session three is the last backup session of the period, each unchanged file from file a/i/o/p through the last unchanged file in the file system tree, in this embodiment file a/i/q/u (212) is backed up. This is shown graphically as the files within area 221. The last backup session of the period backs up all unchanged files in the backup space remaining after the last successfully backed up file. As each unchanged file is backed up, the size of the backed up files, or in another embodiment, the number of backed up files, is summed, and when the file tree walk process reaches the last unchanged file a/i/q/u, the algorithm has backed up all remaining unchanged files in the backup space, and the third and final backup session is complete.

At this time, the rolling backup period is complete. If this backup period is the first overall backup period for the backup space using the process of FIG. 1, at this point, a full rolling backup is complete, and the N backup sessions are usable to create a full system restore. When the next backup period begins, there is no last successfully backed up file saved, since the last file of the backup space was backed up with the last backup session of the previous period. At this point, process flow backs up the first 1/N of the backup space as it exists at the start of the new period. To maintain a full rolling backup over N backup sessions, the process does not stop backing up unchanged files until it reaches or surpasses (in case this file has been deleted) the last successfully backed up file of the session N backups ago. As each backup session is completed, that backup session and the previous N−1 backup sessions form a complete system backup from which a full system restore operation can be performed. That is, once the first N backup sessions with a backup space defined by parameter N are completed, each subsequent successful backup session can be used with the previous N−1 backup sessions to perform a full system restore.

The file system tree is walked in the same order for each backup session. Any repeatable ordering of files within the backup space allows for the file system tree to be walked in the same order each time. The specifics of ordering the files within a file tree system may change without departing from the scope of the disclosure. It should be understood that any ordering scheme that orders files the same way each time may be used, and that such ordering schemes are within the skills of one of ordinary skill in the field.

If there are files in the file system tree that have been changed or deleted after the first backup session, those files are found and backed up or found and noted as deleted in the incremental portion of the backup session. If the last successfully backed up file has been deleted between the immediate previous backup session and the current backup session, the ordered file system allows the current backup session to start with the first file found after the last successfully backed up file in the ordered arrangement of the files within the backup space. If the file immediately following the last successfully backed up file has been deleted, that is found during the incremental portion of the backup session, and the next unchanged file after the last successfully backed up file is the first unchanged file backed up in the current backup session.

Typically, backup sessions are performed on a daily basis. However, it should be understood that backup sessions can be performed more or less often without departing from the scope of the disclosure, depending upon what is desired.

The value of N can be determined in any number of ways. For example only and not by way of limitation, N may be determined by an administrator specifying that a full rolling backup is to be completed after N sessions, with N chosen based on the time available for a backup session, the storage available for a backup session, or the like. Once the backup space is determined, then the rolling backup can be broken into backup sessions independent of the backup space, for example a certain amount of bytes per backup session. This would not allow a pre-determination of N. If the number of files on the system is determined, then a certain number of files can be backed up per day. Also, N can be pre-defined to be within a range, for example $7 \leq N \leq 10$, and N is determined by a backup system depending upon conditions within the system.

Figure 5:
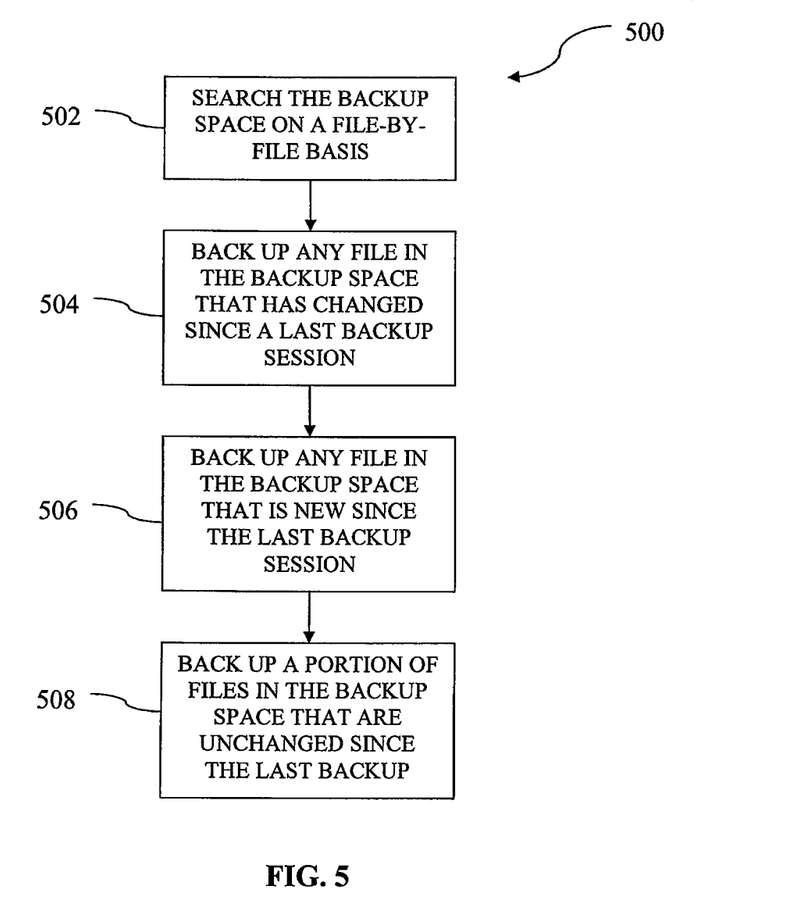
FIG. 5 is a flow chart diagram of a method of backing up a backup space, according to another embodiment of the disclosure.

An embodiment of another method 500 of backing up a backup space with a plurality of rolling backup sessions is shown in FIG. 5. Method 500 comprises, for each rolling backup session, searching the backup space on a file-by-file basis in block 502, backing up any file in the backup space that has changed since a last backup session in block 504, backing up any file in the backup space that is new since the last backup session in block 506, and backing up a portion of files in the backup space that are unchanged since the last backup in block 508.

The various embodiments of the disclosure provide a leveling of a backup of a backup space over a plurality of backup sessions, each session having approximately equal amounts of data to be backed up.

Various embodiments of the present disclosure may be embodied in a computer program product, which may include computer readable program code embodied thereon, the code executable to implement a method such as the methods described herein for backing up a backup space. The computer readable program code may take the form of computer-readable instructions. These computer-readable instructions may be stored in a memory, such as a computer-usable medium, and may be in the form of software, firmware, hardware, or a combination thereof. The computer-readable instructions configure a computer to perform various methods, such as described below in conjunction with various embodiments of the invention.

In a hardware solution, the computer-readable instructions are hard coded as part of a processor, e.g., an application-specific integrated circuit (ASIC) chip. In a software or firmware solution, the instructions are stored for retrieval by the processor. Some additional examples of computer-usable media include static or dynamic random access memory (SRAM or DRAM), read-only memory (ROM), electrically erasable programmable ROM (EEPROM or flash memory), magnetic media and optical media, whether permanent or removable. Most consumer-oriented computer applications are software solutions provided to the user on some form of removable computer-usable media, such as a compact disc read-only memory (CD-ROM) or digital video disc (DVD). Alternatively, such computer applications may be delivered electronically, such as via the Internet or the like.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method of backing up a backup space, the method comprising:
    splitting a complete backup of the backup space into a plurality of N rolling backups;
    backing up all changed and new files and a portion of unchanged files on each of the plurality of N rolling backups;
    backing up 1/N of the unchanged files on each of a first N-1 of the plurality of N rolling backups;
    backing up all remaining unchanged files on the Nth rolling backup; and storing the plurality of N rolling backups.

2. The method of claim 1, wherein splitting further comprises determining a backup space size, and determining a size limit for each of the plurality of N rolling backups based on the backup space size and N.

3. The method of claim 1, wherein backing up a portion of unchanged files further comprises remembering a last successfully backed up unchanged file location for a current rolling backup.

4. The method of claim 3, wherein backing up a portion of unchanged files begins when a last successfully backed up file location for a previous rolling backup is passed.

5. The method of claim 4, wherein backing up a portion of unchanged files continues until a last successfully backed up file of a rolling backup N rolling backups ago has been reached or passed.

6. The method of claim 1, wherein splitting a complete backup further comprises splitting the complete backup into a number of approximately equal sized rolling backups.

7. The method of claim 1, wherein splitting a complete backup further comprises splitting the complete backup into a plurality of rolling backups based on a desired rolling backup size.

8. The method of claim 1, wherein splitting a complete backup further comprises splitting the complete backup into a plurality of rolling backups based on a particular backup duration.

9. A method of backing up a backup space with a plurality of rolling backup sessions, comprising, for each rolling backup session:
    searching the backup space on a file-by-file basis;
    backing up any file in the backup space that has changed since a last backup session;
    backing up any file in the backup space that is new since the last backup session;
    backing up a portion of files in the backup space that are unchanged since the last backup, wherein backing up a portion of files in the backup space that are unchanged comprises splitting the backup space into N rolling backup sessions, backing up 1/N of the unchanged files, and backing up all remaining unchanged files on the Nth rolling backup session; and
    storing the plurality of rolling backups.

10. The method of claim 9, wherein backing up of the unchanged files further comprises summing a size of each unchanged file that is backed up, and storing a path for the last unchanged file that is backed up.

11. The method of claim 10, and further comprising:
    for a last backup session for the backup of the backup space, determining whether the last successfully backed up file of a backup session N sessions ago has been reached or passed; and
    backing up each unchanged file until the last successfully backed up file of a backup session N sessions ago has been reached or passed.

12. The method of claim 9, further comprising determining for each unchanged file found whether a last successfully backed up file path from an immediately previous rolling backup session has been passed in the search of the backup space, once a last successfully backed up file path from the immediately previous backup session has been passed, backing up each further unchanged file until a limit of 1/N of the unchanged files is reached, and storing a last successfully backed up file path when the limit of 1/N of the unchanged files is reached.

13. A computer program product, comprising a non-transitory computer usable medium having a computer readable program code embodied therein, said computer readable program code to backup a backup space, the code, when executed by one or more processors, causes the one or more processors to:

split a backup of the backup space into a plurality of N rolling backup sessions; and back up a portion of unchanged files and all changed and new files on each of the plurality of N rolling backup sessions;

back up 1/N of the unchanged files on each of a first N-1 of the plurality of N rolling backup sessions; and back up all remaining unchanged files on the Nth rolling backup session.

14. The computer program product of claim 13, wherein the computer readable program code further causes the one or more processors to sum a size of each unchanged file that is backed up, and store a last successfully backed up file path when a limit of 1/N of the unchanged files is reached.

* * * * *

UNITED STATES PATENT AND TRADEMARK OFFICE
CERTIFICATE OF CORRECTION

PATENT NO. : 8,554,736 B2  
APPLICATION NO. : 12/432980  
DATED : October 8, 2013  
INVENTOR(S) : Hendrik Radon et al.

Page 1 of 1

It is certified that error appears in the above-identified patent and that said Letters Patent is hereby corrected as shown below:

In the Claims:

In column 7, line 61, in Claim 1, delete "backups:" and insert -- backups; --, therefor.

In column 7, line 64, in Claim 2, delete "claim 1 ," and insert -- claim 1, --, therefor.

In column 8, line 40, in Claim 10, delete "up" and insert -- up I/N --, therefor.

Signed and Sealed this  
Seventeenth Day of December, 2013

Margaret A. Focarino  
*Commissioner for Patents of the United States Patent and Trademark Office*